July 26, 1966 P. C. KESLING 3,262,207
ORTHODONTIC TORQUING ARCH WIRE LOCK
Filed May 6, 1964 2 Sheets-Sheet 1
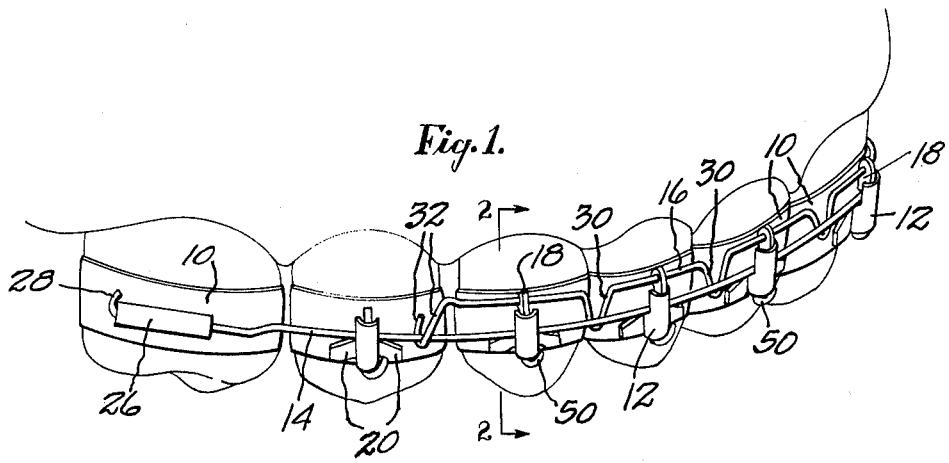
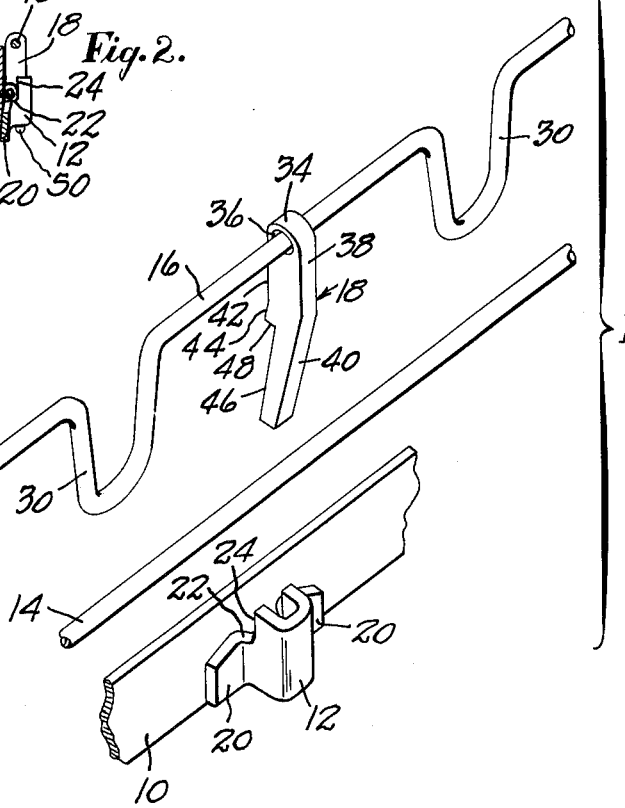
INVENTOR.
PETER C. KESLING
BY Eugene C. Knoblock
ATTORNEY July 26, 1966   P. C. KESLING   3,262,207
ORTHODONTIC TORQUING ARCH WIRE LOCK
Filed May 6, 1964   2 Sheets-Sheet 2

INVENTOR.
PETER C. KESLING
BY Eugene C. Knoblock
ATTORNEY

United States Patent Office 3,262,207
Patented July 26, 1966

3,262,207
ORTHODONTIC TORQUING ARCH WIRE LOCK
Peter C. Kesling, 22 Green Acres, La Porte, Ind.
Filed May 6, 1964, Ser. No. 365,392
7 Claims. (Cl. 32—14)

This invention relates to improvements in orthodontic torquing lock pins by means of which a torquing auxiliary arch wire may be assembled in proper relation to a main arch wire and to tooth bands to exert tooth-positioning forces upon teeth mounting said bands.

Orthodontic devices require the application of bands around teeth whose position is to be changed and around teeth serving as anchor points from which pressure can be exerted upon teeth to be positioned. It is also desirable to avoid the use of bands and band-mounted parts which will tend to collect and retain decay promoting material in contact with a tooth. The orthodontic process also requires successive changes in the positioning of the parts so as to change the application of torque to the teeth, and this renders important the assembly and interlocking of parts in such a manner as to facilitate their release for adjustment and their ready reassembly after adjustment. Prior orthodontic appliances have usually been deficient in one or more of the foregoing particulars, and it is the primary object of this invention to overcome all of the foregoing deficiencies and objections to prior devices.

Another object of the device is to avoid the application of torque applying pressure from a torquing auxiliary wire against a tooth at a portion of the tooth which is not protected by the band, without requiring the use of a band of a width to extend to the gum line.

A further object is to provide a device of this character wherein a plurality of torquing lock pins may be strung upon a auxiliary torquing arch wire at spaced intervals to produce a sub-assembly which can be applied in operative position to a main arch wire and to tooth bands by simply inserting the pins in brackets upon the bands.

A further object is to provide an orthodontic assembly including a torquing lock pin so mounted upon an auxiliary arch wire as to accommodate the proper orientation of the pin, the auxiliary arch wire, a main arch wire and a bracketed tooth band to each other for the purpose of applying desired tooth-positioning force either lingually, palatally, labially, mesially or distally.

A further object is to provide an orthodontic torquing arch wire lock which reduces to a minimum the possibility of discomfort of a patient due to contact of the lip of the patient with the device.

Other objects will be apparent from the following specification.

In the drawing:

FIG. 1 is a perspective view illustrating my improved orthodontic appliance as applied operatively to a plurality of teeth;

FIG. 2 is a transverse sectional view taken on line 2—2 of FIG. 1;

FIG. 3 is a perspective exploded view illustrating the individual parts comprising my improved device;

Figure 4:
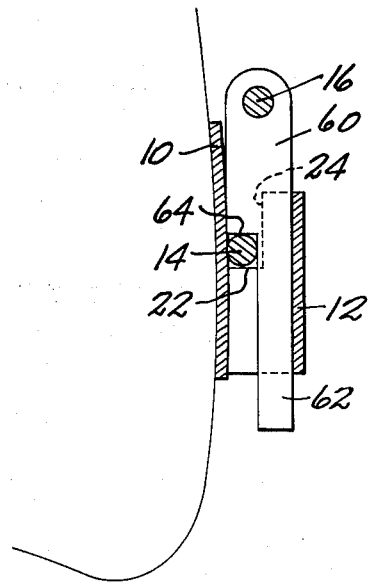
FIG. 4 is a sectional view of a modified device.

Referring to the drawing, my improved device constitutes a plurality of tooth bands 10 adapted to be mounted upon individual teeth with one or more having a bracket 12. A main arch wire 14 cooperates with the respective bands and brackets. A torquing auxiliary wire 16 is utilized to apply torque, and one or more torquing lock pin 18 anchored at the band sockets 12 anchor the main arch wire 14 and the torquing auxiliary wire in operative relation.

The tooth bands 10 are of conventional character, being formed of metal and are applied to the individual teeth in the conventional manner well understood in the art. The bands 10 are preferably narrow compared to the length of the projecting portions of the teeth upon which they are mounted, so that said bands may have their edges terminate clear of the gum of the patient with respect to most, if not all, of the teeth as illustrated in FIG. 1.

Selected bands 10 mount a bracket 12. Bracket 12 is preferably of generally U-shaped configuration, having a pair of laterally projecting flanges or wing portions 20 at its opposite sides at which the bracket is soldered or otherwise fixedly secured to the band 10. The flange portions 20 preferably are of a dimension, in a direction transverse of the band 10, less than the central U-shaped part of the bracket. The U-shaped central part of the bracket is cut away, as here shown, adjacent to the upper edge of each bracket 12 to define a shoulder 22. The free edges of the projecting end of the U-shaped socket-defining part at 24 which confronts the band 10 are spaced therefrom, as best seen in FIG. 2, said spacing preferably being slightly greater than the cross-sectional diameter of the main arch wire 14 so as to permit the main arch wire to be readily inserted between the edges 24 and the band 10 to rest upon the shoulders 22 of each bracket. The length of the socket member 12 or bracket in a vertical direction transverse of the band 10 is preferably less than the width of the band 10. Thus the shoulder 22 may be located so as to position the main arch wire 14 substantially mid-width of the band 10. The bracket 12 defines an elongated narrow passage or socket extending transversely of the band 10 at the outer surface thereof and will normally be positioned substantially centrally of each tooth at the outer side of the tooth.

The main arch wire 14 is curved to substantially conform to the curvature of the dental arch or that portion thereof to be treated. The ends of the main arch wire extend through and are retained by suitable socket members 26 carried by anchor teeth. The sockets 26 have the end portions of the main arch wire extending therethrough, and the main arch wire preferably is bent at 28 at its outer ends to hold the main arch wire 14 against release. The main arch wire will be positioned relative to each individual band 10 by the projecting portion 24 of each bracket 12 while it rests upon shoulders 22 of the bracket of each of the tooth bands mounted on teeth between the anchor teeth at which the anchoring sockets 26 are located.

The torquing auxiliary wire 16 is bent into general conformity with the dental arch or that portion thereof which is to be treated. The torquing wire 16 has one or more U-shaped bends 30 formed therein, and preferably a plurality of bends at spaced intervals along its length and projecting vertically therefrom. The spacing of the bends 30 of the torquing auxiliary wire is preferably substantially equal to the width of a tooth so that the bends 30 may preferably be positioned in the interdental spaces between adjacent teeth and spaced from and between the brackets 12 on the bands encircling adjacent teeth. The orientation of the U-shaped projections 30 to one another and to the general configuration of the arch of the torquing auxiliary wire will vary according to requirements of treatment and according to the type of pressure which is to be exerted by the torquing wire. This orientation may be different at the different U-shaped bends 30. The free end portions of the auxiliary torquing wire 16 are preferably bent to form hook portions 32 engaging the main arch wire 14, as illustrated in FIG. 1.

One or more torquing lock pins 18 are assembled upon the torquing auxiliary wire 16 preparatory to assembly of the appliance. Each pin 18 is characterized by a narrow elongated rigid body portion which may be formed of plastic or metal, such as brass or stainless steel or other suitable material. The pin body is preferably rounded at one end 34 thereof, and has an aperture 16 therein of a diameter slightly larger than the diameter of the torquing auxiliary wire 16, so that the pin 18 may be freely threaded upon the torquing auxiliary wire and past the U-bends 30 thereof to assume any selected position upon the wire 16. In the preferred form, one pin 18 will be threaded upon the torquing auxiliary wire 16 between each pair of adjacent U-bends thereof and between the endmost U-bend 30 and the terminal hook portion 32.

The pin 18 is preferably of uniform thickness throughout and, at one longitudinal edge thereof, preferably has an edge portion 38 at the end thereof adjacent the aperture 36 and a second edge portion 40 thereof extending at a slight angle to the surface 38 in a direction toward the tooth when the surfaces 38 and 40 are positioned remote from the tooth. The opposite or tooth-confronting longitudinal edge of each pin is preferably provided with a straight portion 42 substantially parallel to the edge 38, an angularly inwardly extending short portion 44 mid-length of the pin and substantially parallel to the face 40, and an offset portion 46 extending in slightly converging relation to the surface 40 toward the free end of the pin so that the free portion of the pin defined between the surfaces 40 and 46 is preferably slightly tapered. A shoulder 48 is defined between the surfaces 44 and 46 approximately mid-length of the pin 18.

In the use of the device, locking pins 18 are first strung upon the torquing auxiliary wire 16 to define a subassembly with a pin located between each U-bend 30, as previously mentioned, and between the outermost U-bends 30, and the adjacent hook end portions 32 of the torquing auxiliary wire. Assuming that the teeth have been banded and that the brackets 12 of the bands on teeth to be adjusted are properly positioned, the main arch wire 14 will be fitted to the banded teeth to be retained or supported upon the shoulders 22 of the brackets. The wire ends are anchored at the anchor sockets 26 and retained by the terminal bends 28. The torquing auxiliary wire 16 will be bent into arch form with the U-bends 30 thereof oriented thereto at selected angles. The sub-assembly, consisting of the torquing auxiliary wire 16 and the pins 18, will then be moved to desired position to cause the individual pins 18 to seat in receiving brackets 12 and to cause the bends 30 of the torquing auxiliary wire to assume desired positions with relation to the main arch wire between the brackets 12 and preferably between adjacent teeth. In this connection it will be apparent that the direction in which the individual teeth are to be moved will determine the orientation and angular direction of projection of the U-bends 30 and also will determine the position of those bends relative to the main arch wire 14. In the arrangement illustrated in FIG. 1, the U-bends 30 have been illustrated as being positioned behind the main arch wire 14. This is the arrangement which would be characteristically employed in order to tip the tooth root lingually. It will be understood, however, that where it is desired to tilt the tooth root labially, the bends 30 of the torquing auxiliary wire will press on the labial surface of the main arch wire 14.

The shape or configuration of the pin 18 is such that when the tapered lower end portion thereof is introduced into a bracket 12, it positions the pin with one of its surface parts 42 and 44 in engagement with the outer face of the band 10 above the level of the main arch wire 14, and thereby causes the pin to assume a firm socketed position in the bracket 12. The shoulder 48 of the pin serves to anchor or retain the main arch wire 14 relative to the band 10 and bracket 12 and also serves to maintain a predetermined minimum spacing between the main arch wire 14 and the torquing auxiliary wire 16. At the same time, the retention of the torquing auxiliary wire 16 in the apertures 36 of the pins 18 serves to hold the torquing auxiliary wire 16 clear of the adjacent teeth even in cases where it is located at a level above the level of the upper margin of the tooth band as illustrated in FIG. 2. The individual pins 18 preferably are of such length that when they are firmly seated in the brackets 12 the lower end portions thereof will project below the level of the bracket 12. If desired, the projecting lower end portion 50 of each pin can then be bent as seen in FIG. 1 to retain it against release from the bracket 12.

It will be apparent that the assembly of the torquing auxiliary wire is accomplished quickly and expeditiously by the insertion of the pins 18 in the brackets 12, which can be accomplished rapidly. Only the engagement of the bends 32 at the ends of the auxiliary torquing arch wire with the main arch wire and the bending of the parts 50 of the pins is required to complete the operative assembly. Similarly, to disassemble the units, it is only necessary to straighten the pin ends 50 and release the bends 32 of the auxiliary wire 16 from the main wire 14 in order to remove the torquing auxiliary wire, as required for the purpose of adjustment.

It will be apparent from the foregoing that the surfaces of the teeth are protected from contact by all parts of the device except the tooth bands encircling the same, even though the tooth bands are narrow and parts of the apparatus project either above or below the tooth band. It will also be apparent that the pin and socket type of interlock provided, wherein the shape of the pins orients them to the band and to the teeth to avoid contact with the teeth, simplifies manipulation of the device for application thereof and removal for adjustment. The device can operate effectively to tip the tooth root lingually, that is, toward the tongue, or palatally, that is, toward the palate, or labially, that is towards the lips.

Another important consideration of the device is that the shape of the bracket 12 and the manner in which the pins 18 fit therein, and the manner in which the wires 14 and 16 are positioned, reduce to a minimum surfaces or edges of parts tending to irritate the lip of the patient or to cause discomfort to the patient, or to produce sores.

An alternative construction of torquing lock pin is illustrated in FIG. 4 as applied to the other parts of the device as previously described. The locking pin of this construction has a substantially straight upper end portion 60 provided with an aperture permitting it to be strung upon the torquing auxiliary wire 16. Pin part 60 is of a transverse dimension to fit snugly within the socket of bracket 12. A reduced width portion 62 completes the pin, the same being of a transverse dimension to facilitate insertion thereof between the main arch wire 14 and the band socket 12, as illustrated at FIG. 4. A shoulder 64 is formed between the pin parts 60 and 62 and bears upon and retains the arch wire 14. The part 62 will preferably be of a length to project below the bottom edge of the bracket 12 so that it may be bent laterally, as explained previously. Note in this instance that the tapered character of pin 18 at its reduced part is not utilized nor is the angular configuration of the parts of pin 18 utilized. This pin will serve effectively to retain the main arch wire at each bracket 12 and to maintain the selected spacing between the main arch wire and the torquing auxiliary wire 16.

Figure 5:
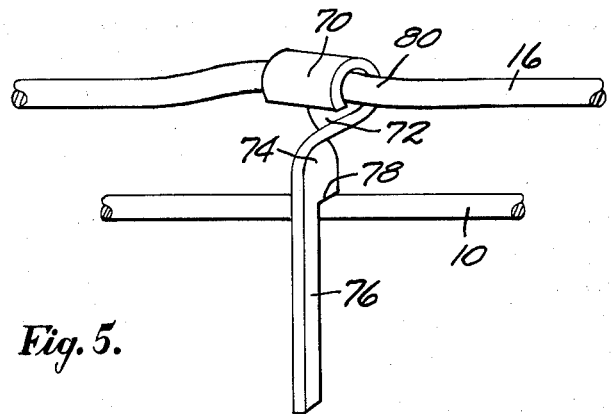
FIG. 5 is a perspective view of another modification.

Another modified embodiment of torquing lock pin is illustrated in FIG. 5. This torquing lock pin is characterized by a wide portion 70 which fits around the torquing auxiliary wire 16 and which may initially be formed in U-shape to facilitate its application to the torquing wire and then bent into loop form to anchor it to the torquing auxiliary wire. If desired, the part 70 may apply a grip upon the torquing auxiliary wire to resist its swinging upon that wire. The pin may be twisted at 72 immediately below the torquing wire through approximately ninety degrees so that the portion 74 thereof is presented substantially at right angles to the torquing wire and also to the main arch wire 14. A reduced thickness lower end portion 76 adapted to fit in bracket 12 completes the pin and provides a shoulder 78 thereof which is adapted to overlie the main arch wire 14. It will be understood that this torquing lock pin is inserted in a bracket member 12 in the same manner discussed above and it cooperates to maintain the selected spacing of the wires 14 and 16. This construction possesses the inherent additional advantage that it permits the application of force from the torquing auxiliary wire 16 to the tooth band and the tooth on an axis substanitally perpendicular to the axis of the tooth, i.e., mesially or distally. Note in this connection that the torquing auxiliary wire 16 has been illustrated as being deflected at 80 at the part upon which the torquing lock pin 70–78 is mounted, as required to provide for exertion of such turning torque from the torquing auxiliary wire 16 to the tooth.

While the preferred embodiments of the invention have been illustrated and described, it will be understood that changes in the construction may be made within the scope of the appended claims without departing from the spirit of the invention.

I claim:
1. In combination,
a main dental arch wire,
a torquing auxiliary wire having a vertically projecting bend intermediate its length and having torque applying engagement with said main wire,
a plurality of tooth-encircling bands,
a bracket carried by selected bands and including an upwardly projecting part defining a shoulder and spaced from said band to confine said main arch wire while bearing upon said shoulder, and
a plurality of locking pins having their upper ends mounted on said auxiliary wire and each fitting in a bracket to overlie said main arch wire and maintain a substantially predetermined spacing between said wires.

2. In combination,
a main dental arch wire,
a torquing auxiliary wire having a vertically projecting bend intermediate its length and having torque applying engagement with said main wire,
a plurality of tooth-encircling bands,
a bracket carried by and spaced below the upper margin of each band and defining a vertical socket, and
a plurality of locking pins having their upper ends strung on said auxiliary wire,
each locking pin seating in a bracket socket and having a shoulder overlying and positioning said main wire to establish a predetermined minimum spacing between said wires.

3. In combination,
a main dental arch wire,
a torquing auxiliary wire having a vertically projecting bend intermediate its length and having torque applying engagement with said main wire,
a plurality of tooth-encircling bands,
a bracket carried by and spaced below the upper margin of each band and defining a vertical socket, and
a plurality of locking pins having apertured upper ends and strung on said auxiliary wire between adjacent bends,
each locking pin having a main wire-retaining shoulder intermediate its length and a lower tapered portion wedged in said bracket and positioning the upper part of said pin against said band to position said auxiliary wire in selected spaced relation to the tooth mounting said band.

4. In combination,
a main dental arch wire,
a torquing auxilary wire having a vertically projecting bend intermediate its length and having torque applying engagement with said main wire,
a plurality of tooth-encircling bands,
a bracket carried by and spaced below the upper margin of each band and defining a vertical socket, and
a plurality of locking pins having apertured upper ends and strung on said auxiliary wire,
each locking pin having a main-wire-retaining shoulder intermediate its length,
the lower portion of each pin having an outer longitudinal surface extending angularly to the upper part of said pin whereby seating of the lower part of said pin in a socket urges the upper part of said pin against said band above said socket and the main wire retained thereby.

5. In combination,
a main dental arch wire,
a torquing auxiliary wire having a vertically projecting bend intermediate its length and having torque applying engagement with said main wire,
a plurality of tooth-encircling bands,
a bracket carried by and spaced below the upper margin of each band and defining a vertical socket, and
a plurality of locking pins having their upper ends strung on said auxiliary wire between said bends,
each locking pin confining said main wire adjacent to the upper end of a bracket and spacing said auxiliary wire vertically from said main wire and outwardly from the tooth mounting the adjacent band.

6. In combination,
a main dental arch wire,
a torquing auxiliary wire having a vertically projecting bend intermediate its length and having torque applying engagement with said main wire,
a plurality of tooth-encircling bands,
a bracket carried by and spaced below the upper margin of each band and defining a vertical socket, and
a plurality of locking pins having their upper ends strung on said auxiliary wire,
each locking pin seating in a bracket socket and having a shoulder overlying and positioning said main wire on said bracket to establish a predetermined minimum spacing between said wires,
said pins projecting from and bent laterally below the lower ends of said brackets.

7. The combination defined in claim 6, wherein said locking pins are of substantial width to engage a portion of the length of said torquing auxiliary wire greater than the diameter of said wire.

References Cited by the Examiner
UNITED STATES PATENTS

| | | | |
|---|---|---|---|
| 1,323,141 | 11/1919 | Young | 32—14 |
| 2,230,315 | 2/1941 | Winslow | 32—14 |

OTHER REFERENCES

"Kessler Bracket" ad by Engelhard Inds. Inc. on advertising page 2 of American Journal of Orthodontics, vol. 49, #5 for April 1963.

RICHARD A. GAUDET, *Primary Examiner.*

J. W. HINEY, *Assistant Examiner.*